(No Model.) 2 Sheets—Sheet 1.
M. BERMOND.
COMBINED HOOD, BOA, AND COLLAR.
No. 370,174. Patented Sept. 20, 1887.
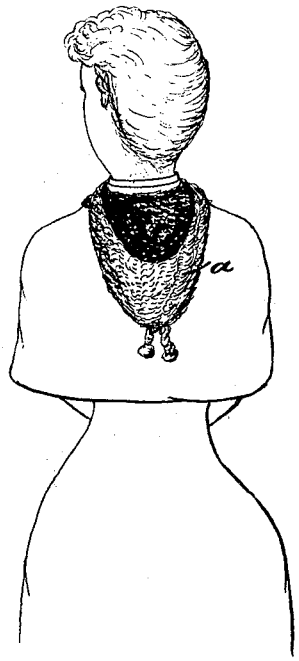
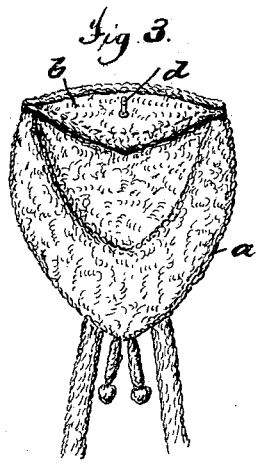
Attest:
Geo. H. Botts.
Fred K. Carragan.
Inventor:
Moress Bermond
By Ernest Webb
his Atty.

(No Model.) 2 Sheets—Sheet 2.
M. BERMOND.
COMBINED HOOD, BOA, AND COLLAR.
No. 370,174. Patented Sept. 20, 1887.
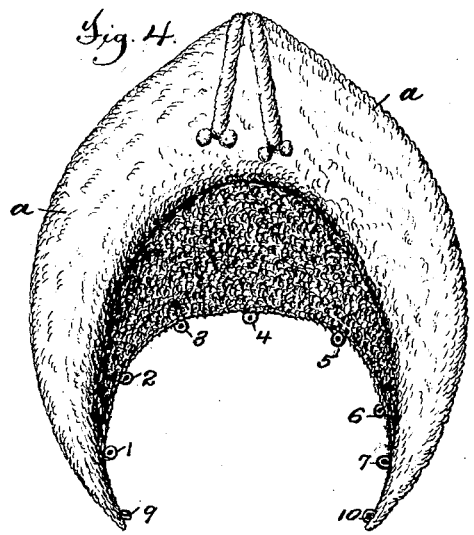
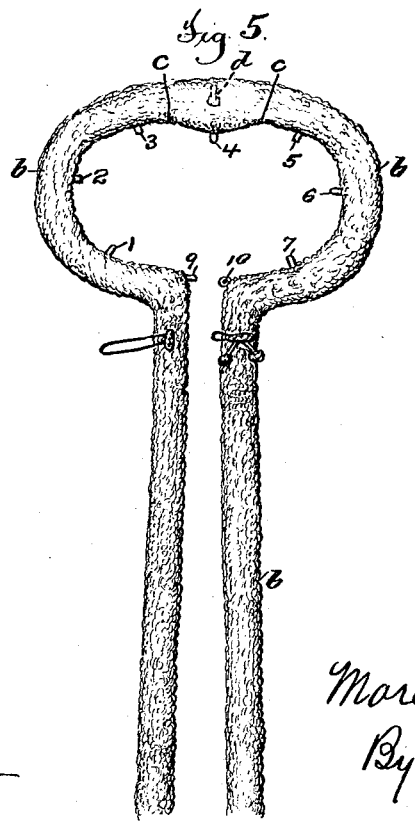

UNITED STATES PATENT OFFICE.

MORESS BERMOND, OF NEW YORK, N. Y.

COMBINED HOOD, BOA, AND COLLAR.

SPECIFICATION forming part of Letters Patent No. 370,174, dated September 20, 1887.

Application filed May 25, 1887. Serial No. 239,357. (No model.)

*To all whom it may concern:*

Be it known that I, MORESS BERMOND, a subject of the Emperor of Russia, but now about to become a citizen of the United States, residing at New York city, in the county of New York and State of New York, have invented certain new and useful Improvements in Combined Hood, Boa, and Collar, of which the following is a full, clear, and exact description.

This invention relates to certain improvements in wearing-apparel, such as hoods, boas, and collars, which are intended to be worn over and in connection with other garments, and are ordinarily made of fur or like material, the object being to produce a combined hood, boa, and collar, which can be connected together and worn at the same time, or can be separately worn when desired.

To this end my invention consists in a combined hood, boa, and collar possessing the characteristic to be hereinafter more fully described and claimed.

In the accompanying drawings I have illustrated in Figure 1 one method of wearing my combined hood, collar, and boa, with the collar turned down; and in Fig. 2 the hood is shown as worn independently. Fig. 3 is a plan view of the hood attached to the collar so that the latter will form a "stand-up" collar. Fig. 4 is a plan view of the hood detached, and Fig. 5 a perspective view of the collar and boa detached.

*a* designates the hood, which is of the ordinary construction and adapted to be worn as a hood, as shown in Fig. 1, or as a cape, as shown in Fig. 2. This hood is provided with a series of fastening devices, preferably eyelets, 1, 2, 3, 4, 5, 6, and 7, by means of which it may be secured in place, as hereinafter described.

*b* designates a combined collar and boa. The collar is provided with a series of fastening devices, preferably hooks, 1, 2, 3, 4, 5, 6, and 7, which are arranged to engage with the similarly-designated fastening devices of the hood, and by this means the hood and collar can be connected when desired. Both the collar and hood are also provided with fastening devices 9 and 10, by means of which either article can be secured in position around the neck of the wearer. The boa is provided with the usual fancy buttons and loops, which are commonly employed to hold the two portions together when desired.

It will be noticed that the collar is of about the same dimensions throughout, except between the points marked *c c*, where its width is increased, as shown. At about the center of this enlarged portion I attach a fastening device, preferably a hook, *d*, and when the collar is to be worn as a "turn-down" collar, as shown in Fig. 1, this hook *d* is engaged with the eye 4 of the hood, and that portion of the collar between its hooks *d* and 4 rests under the hood. When the collar is to be worn as a stand-up collar, as shown in Fig. 3, the hook 4 is engaged with the eye 4.

It will be observed that the collar and boa can be worn without the hood, and the hood can be worn independently of the collar and boa, when desired, and in either case may be connected to a jacket or similar garment provided with fastening devices corresponding, as described, with those of the hood and collar.

In the manufacture of these articles any suitable material may be used, although fur is the preferable material for articles of this class.

What I claim as new, and desire to secure by Letters Patent, is—

The combined collar and hood provided with corresponding fastening devices, whereby they may be removably united together, the said collar being of widened dimensions between the points marked *c c* and provided with a fastening device between such points, substantially as described.

In testimony whereof I have hereunto set my hand this 20th day of May, A. D. 1887.

MORESS BERMOND.

Witnesses:
THORNE S. WALLING,
ERNEST C. WEBB.